(12) United States Patent
Hatta

(10) Patent No.: US 11,318,686 B2
(45) Date of Patent: May 3, 2022

(54) MANUFACTURING METHOD AND MANUFACTURING APPARATUS FOR PRESSURE TANK

(71) Applicant: TOYOTA JIDOSHA KABUSHIKI KAISHA, Toyota (JP)

(72) Inventor: Ken Hatta, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 725 days.

(21) Appl. No.: 16/135,609

(22) Filed: Sep. 19, 2018

(65) Prior Publication Data

US 2019/0084249 A1 Mar. 21, 2019

(30) Foreign Application Priority Data

Sep. 21, 2017 (JP) .............................. JP2017-180768

(51) Int. Cl.
| | | |
|---|---|---|
| *B29C 65/00* | (2006.01) | |
| *B29C 70/36* | (2006.01) | |
| *B29C 70/48* | (2006.01) | |
| *B29C 70/32* | (2006.01) | |
| *B29C 70/46* | (2006.01) | |
| *B29C 41/08* | (2006.01) | |

(Continued)

(52) U.S. Cl.
CPC ............ *B29C 66/54* (2013.01); *B29C 41/085* (2013.01); *B29C 41/20* (2013.01); *B29C 70/32* (2013.01); *B29C 70/36* (2013.01); *B29C 70/467* (2013.01); *B29C 70/48* (2013.01); *F17C 1/16* (2013.01); *B29C 39/24* (2013.01); *B29C 45/006* (2013.01); *B29C 45/1615* (2013.01); *B29L 2031/7156* (2013.01)

(58) Field of Classification Search
CPC ......... B29C 66/54; B29C 70/36; B29C 70/48; B29C 70/32; B29C 70/467; B29C 41/085; B29C 41/20; B29C 39/24; B29C 45/006; B29C 45/1615; B29C 70/16; B29C 70/345; B29C 70/54; B29C 45/78; B29C 45/73; F17C 1/16; F17C 2201/0109; F17C 2203/0604; F17C 2209/2118; F17C 2203/0663; F17C 2209/2145; B29L 2031/7156

See application file for complete search history.

(56) References Cited

U.S. PATENT DOCUMENTS

| | | | |
|---|---|---|---|
| 3,875,275 A | 4/1975 | Lemelson | |
| 2008/0264551 A1* | 10/2008 | Wood | .................... B29C 70/446 156/172 |
| 2014/0141114 A1* | 5/2014 | Kulesha | ............... B29D 99/001 425/388 |

FOREIGN PATENT DOCUMENTS

| | | |
|---|---|---|
| EP | 3 181 321 A1 | 6/2017 |
| JP | 2005-319683 A | 11/2005 |

(Continued)

*Primary Examiner* — Jacob T Minskey
*Assistant Examiner* — S. Behrooz Ghorishi
(74) *Attorney, Agent, or Firm* — Finnegan, Henderson, Farabow, Garrett & Dunner, LLP

(57) ABSTRACT

A manufacturing method for a pressure tank includes disposing a preform, in which a fiber layer is formed on an outer surface of a liner that forms an internal space of a pressure tank, within a mold, and rotating the preform in a circumferential direction within the mold with a central axis of the preform as a rotation center while resin is injected toward the preform disposed within the mold from a gate.

5 Claims, 6 Drawing Sheets

(51) Int. Cl.
*B29C 41/20* (2006.01)
*F17C 1/16* (2006.01)
*B29C 39/24* (2006.01)
*B29C 45/00* (2006.01)
*B29C 45/16* (2006.01)
*B29L 31/00* (2006.01)

(56) References Cited

FOREIGN PATENT DOCUMENTS

| | | |
|---|---|---|
| JP | 2007-125844 A | 5/2007 |
| JP | 2008-132717 | 6/2008 |
| JP | 2008-246690 | 10/2008 |
| KR | 10-2011-0124046 A | 10/2012 |

\* cited by examiner

MANUFACTURING METHOD AND MANUFACTURING APPARATUS FOR PRESSURE TANK

INCORPORATION BY REFERENCE

The disclosure of Japanese Patent Application No. 2017-180768 filed on Sep. 21, 2017 including the specification, drawings and abstract is incorporated herein by reference in its entirety.

BACKGROUND

1. Technical Field

The present disclosure relates to a manufacturing method and a manufacturing apparatus for a pressure tank reinforced by fiber, and particularly, to impregnation and curing of resin in fiber.

2. Description of Related Art

Japanese Unexamined Patent Application Publication No, 2008-132717 (JP 2008-132717 A) discloses a manufacturing method for a tank made of fiber reinforced plastics (FRP). In the manufacturing method, an impregnating step of impregnating resin in fiber is performed after a coating step of winding the fiber around a metallic core to cover the core is performed. Thereafter, the resin is cured by heating the fiber in which the resin is impregnated.

SUMMARY

It is considered that the above-described method is applied to manufacture of a pressure tank. Specifically, as the coating step, a preform is prepared by thickly laminating the fiber on a liner, and the resin is impregnated in the fiber layer serving as the preform. Here, when the fiber is thickly laminated, the resin is not easily impregnated in the fiber at a deep position from the surface of the preform. In order to promote the impregnation, it is considered to inject the resin at high pressure. However, when the resin is injected at the high pressure, problems may occur such that the high pressure is applied to one point directly below a gate and the fiber or the liner is deformed.

The present disclosure provides a manufacturing method and a manufacturing apparatus for-a-pressure tank that can suppress problems caused by a pressure resulting from injection of resin, in a case where the resin is impregnated in a preform in which the fiber is thickly laminated, in order to manufacture a pressure tank.

A first aspect of the present disclosure relates to a manufacturing method for a pressure tank. The manufacturing method includes disposing a preform, in which a fiber layer is formed on an outer surface of a liner that forms an internal space of a pressure tank, within a mold; and rotating the preform in a circumferential direction within the mold with a central axis of the preform as a rotation center while resin is injected toward the preform disposed within the mold from a gate. According to the first aspect of the present disclosure, since the preform is rotating during the injection of the resin, it is possible to avoid that the pressure of the resin injected from the gate concentrates on a specific location of the preform. Moreover, since the preform is rotating during the injection of the resin, the flow length of the resin (in this specification, "flow length" is a meaning including "substantial flow length") becomes short. As a result, the resin can be filled between the mold and the preform even at a still lower injection pressure. In addition, a problem resulting from the pressure of the resin injected from the gate is suppressed.

In the manufacturing method according to the first aspect of the present disclosure, the central axis may not be on a direction of the injection. A direction of a velocity component resulting from the injection of the resin in a direction of a tangential plane of the preform at a position where the injected resin collides with a surface of the preform may be a direction opposite to a velocity in the circumferential direction resulting from the rotation of the preform. According to the first aspect of the present disclosure, the resin injected from the gate is easily impregnated deeply in the fiber layer at a position where the resin collides with the surface of the preform. Moreover, since the resin injected from the gate is easily diffused on the surface of the preform, generation of a weld line is suppressed.

In the manufacturing method according to the first aspect of the present disclosure, the mold may include a first mold and a second mold. The gate may be provided in the first mold. A gap larger than a gap between the second mold and the preform may be formed between the first mold and the preform during the injection. According to the first aspect of the present disclosure, the resin easily flows in between the first mold and the preform from the gate. In addition, the resin can also be filled between the mold and the preform even at a still lower injection pressure.

In the manufacturing method according to the first aspect of the present disclosure, the gap formed between the first mold and the preform during the injection may be a first gap. The first mold may be tightened so as to form the gap formed between the first mold and the preform as a second gap narrower than the first gap after filling of the resin into the mold is completed. According to the first aspect of the present disclosure, after the filling of the resin into the mold is completed, the impregnation can be advanced by an increase in pressure resulting from tightening the first mold. In addition, the surface of the preform in which the resin is impregnated can be smoothed along the first and second molds.

In the manufacturing method according to the first aspect of the present disclosure, the resin may be thermosetting resin. A temperature of the mold may be set to be equal to or higher than a curing temperature of the resin during the injection of the resin into the mold. According to the first aspect of the present disclosure, the resin can be cured from injection in a shorter time.

In the manufacturing method according to the first aspect of the present disclosure, the resin may be thermosetting resin. A temperature of the mold at the time of start of the injection of the resin into the mold may be set to be lower than a curing temperature of the resin. The temperature of the mold after completion of filling of the resin into the mold may be set to be equal to or higher than the curing temperature of the resin. According to the first aspect of the present disclosure, since it is possible to suppress an increase in the viscosity of resin during the injection, the resin can also be filled between the mold and the preform at a still lower injection pressure.

A second aspect of the present disclosure relates to a manufacturing apparatus for a pressure tank. The manufacturing apparatus includes a mold configured to impregnate resin in a preform in which a fiber layer is formed on an outer surface of a liner that forms an internal space of a pressure tank; a temperature control device configured to control a temperature of the mold; a support mechanism configured to support the preform within the mold; a vacuum pump configured to vacuum and degas an inside of the mold; a pressurizing device configured to inject the resin toward the preform from a gate provided in the mold by pressurizing the resin; and a rotating mechanism configured to rotate the preform supported by the support mechanism in a circumferential direction with a central axis of the preform as a rotation center during the injection of the resin.

In the manufacturing apparatus according to the second aspect of the present disclosure, the central axis may not be on a direction of the injection. A direction of a velocity component resulting from the injection of the resin in a direction of a tangential plane of the preform at a position where the injected resin collides with a surface of the preform may be a direction opposite to a velocity in the circumferential direction resulting from the rotation of the preform.

In the manufacturing apparatus according to the second aspect of the present disclosure, the mold may include a first mold and a second mold. The gate may be provided in the first mold. The manufacturing apparatus may include a driving mechanism configured to tighten the first mold from a state where the first mold is open, so as to form a gap, which is larger than a gap between the second mold and the preform, between the first mold and the preform during the injection of the resin into the mold.

In the manufacturing apparatus according to the second aspect of the present disclosure, the gap formed between the first mold and the preform during the injection may be a first gap. The driving mechanism may tighten the first mold so as to form the gap formed between the first mold and the preform as a second gap narrower than the first gap after filling of the resin into the mold is completed.

In the manufacturing apparatus according to the second aspect of the present disclosure, the resin may be thermosetting resin. The temperature control device may set a temperature of the mold to be equal to or higher than a curing temperature of the resin during the injection of the resin into the mold.

In the manufacturing apparatus according to the second aspect of the present disclosure, the resin may be thermosetting resin. The temperature control device may set a temperature of the mold at the time of start of the injection of the resin into the mold to be lower than a curing temperature of the resin, and set a temperature of the mold after completion of filling of the resin into the mold to be equal to or higher than the curing temperature of the resin.

The present disclosure can be realized in various forms other than the above. For example, the present disclosure can be realized in forms of manufacturing apparatuses that execute the manufacturing method.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
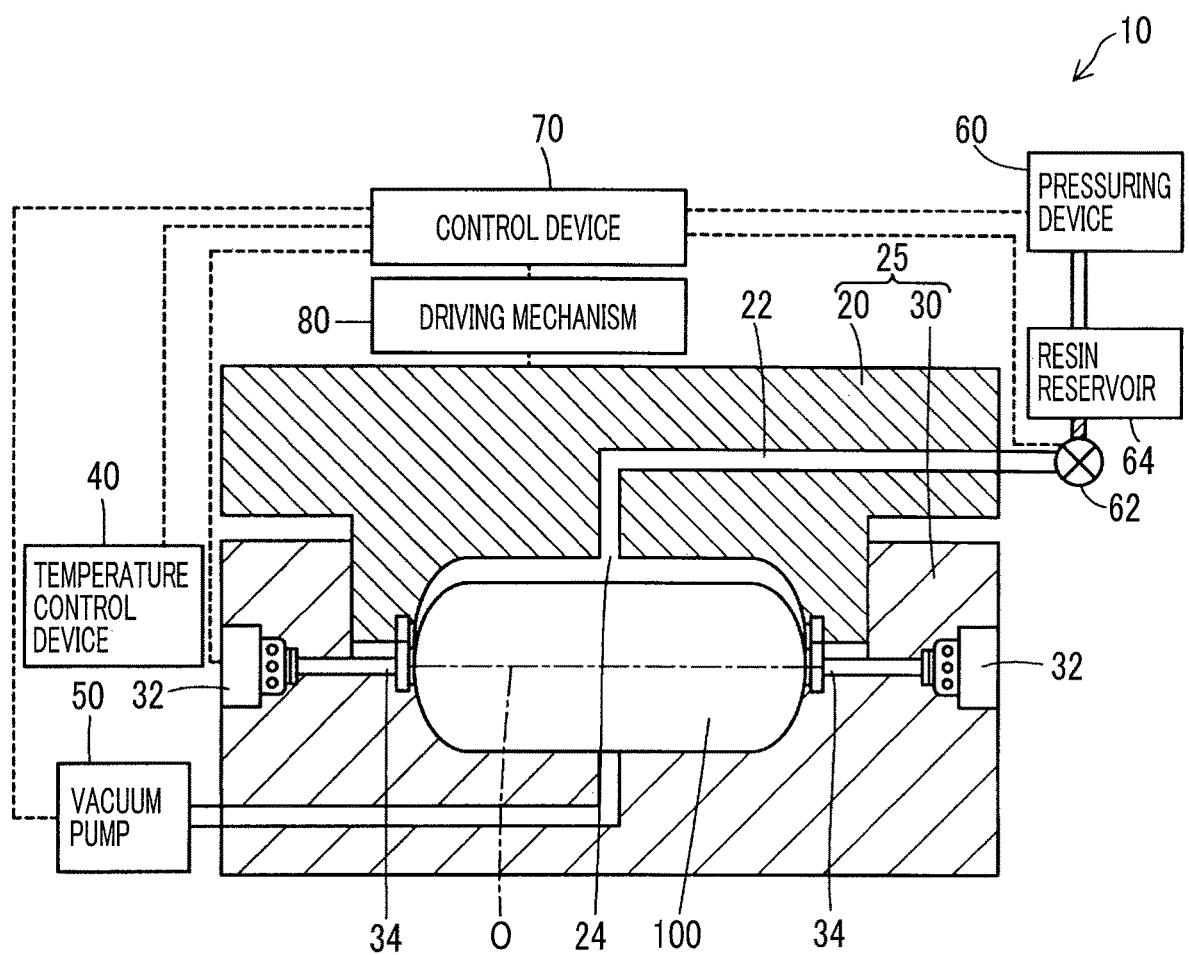
FIG. 1 is a sectional view illustrating a state where a preform is disposed in a manufacturing apparatus for a high-pressure tank.

FIG. 1 is a sectional view schematically illustrating a state where a preform 100 is disposed in a manufacturing apparatus 10. Here, the preform 100 is illustrated by a surface, not a section. The manufacturing apparatus 10 is an apparatus that manufactures a high-pressure tank from the preform 100.

The preform 100 includes a liner, and a fiber layer that is formed on an outer surface of the liner and integrated with the liner. The liner is a hollow member that forms an internal space of the high-pressure tank. The fiber layer has a thickness of about 15 mm to 30 mm. The fiber layer is formed by winding fiber around an outer surface of the liner several times by a filament winding method.

Figure 3:
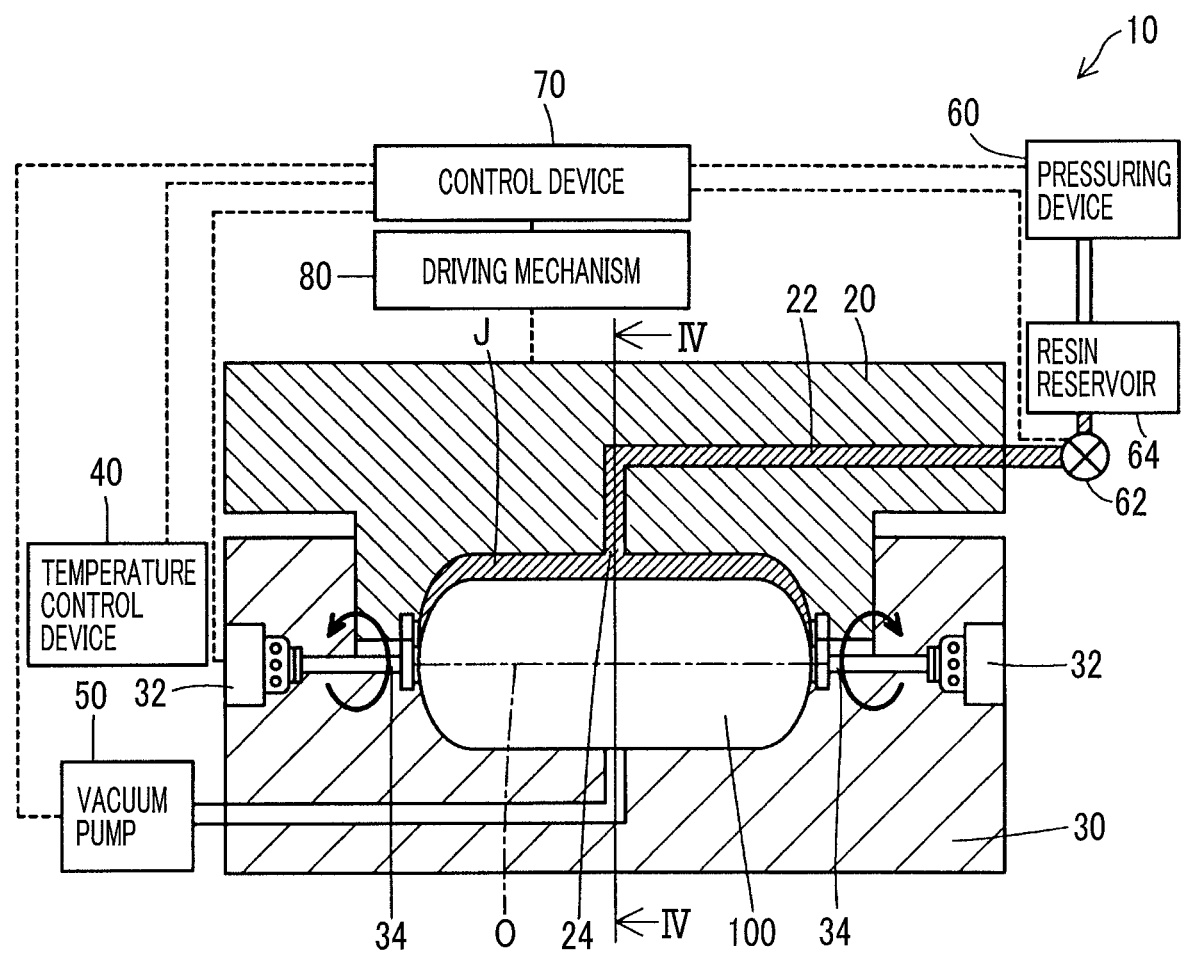
FIG. 3 is a sectional view illustrating a state where the preform is rotated while injecting resin.

The manufacturing apparatus 10 manufactures the high-pressure tank by impregnating resin J (reference sign is illustrated in FIG. 3 and the like) in the fiber layer constituting the preform 100 using an RTM method, and curing the impregnated resin J. The RTM is an acronym of Resin Transfer Molding.

The manufacturing apparatus 10 includes a mold 25, a rotating mechanism 32, a support mechanism 34, a temperature control device 40, a vacuum pump 50, a pressurizing device 60, a valve 62, a resin reservoir 64, a control device 70, and a driving mechanism 80. The mold 25 includes an upper mold 20 and a lower mold 30. The above-described constituent elements will be described together with the manufacturing method for a high-pressure tank.

Figure 2:
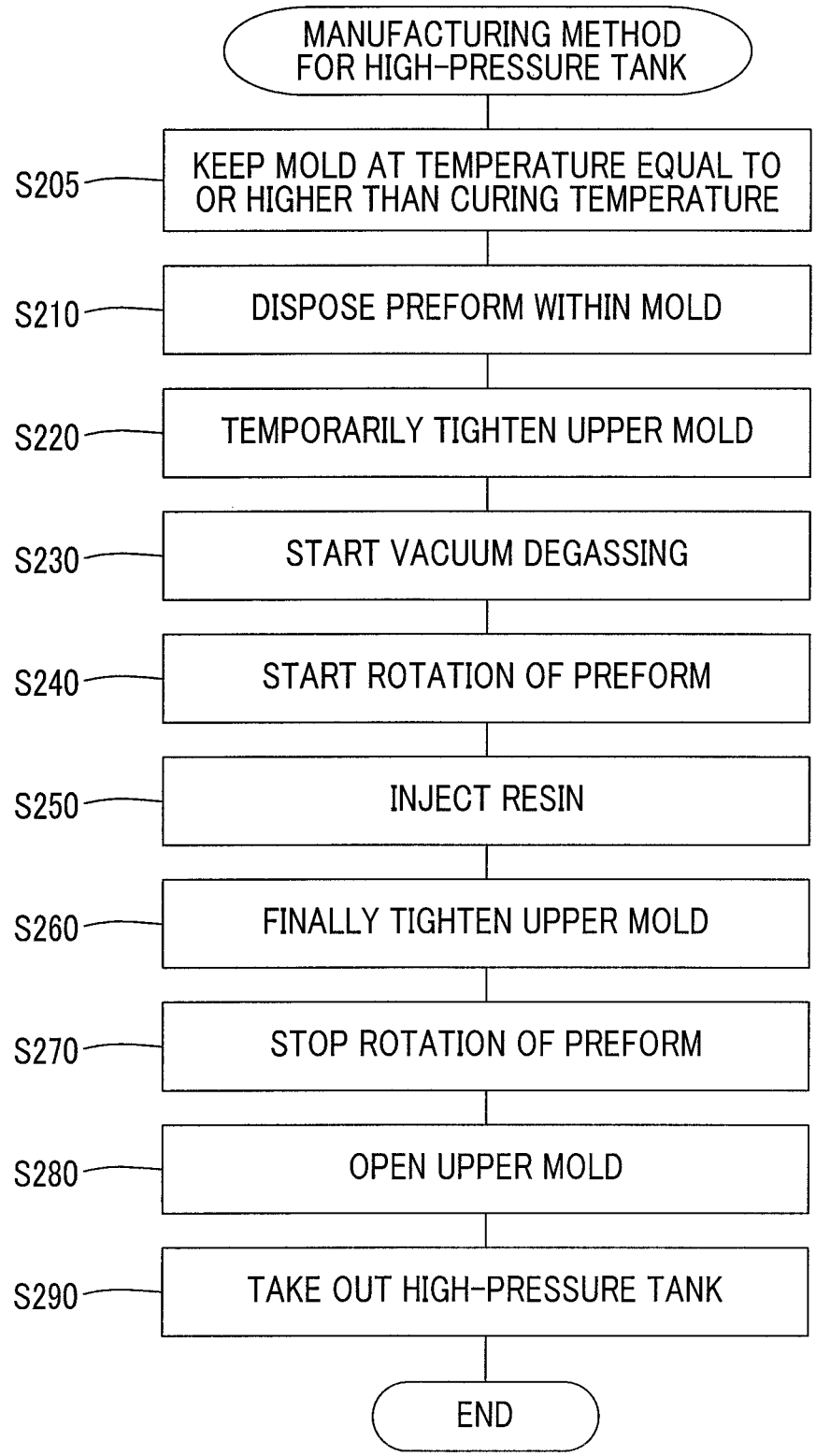
FIG. 2 is a flowchart illustrating a manufacturing method for a high-pressure tank.

FIG. 2 is a flowchart illustrating a manufacturing method for a high-pressure tank. First, the temperature control device 40 keeps the mold 25 at a predetermined temperature (S205). The predetermined temperature is a temperature equal to or higher than the curing temperature of the resin J. The resin J is two-liquid-based thermosetting epoxy resin. The manufacturing method described in the first embodiment of the present disclosure is a method for mass production, and a series of procedures illustrated in FIG. 2 are repeatedly executed. Although S205 is illustrated as one step, S205 is continuously executed while the series of procedures are repeatedly executed. Since the series of procedures are repeatedly executed in a state where the predetermined temperature is kept as described above, manufacture of the next high-pressure tank can be started immediately after manufacture of one high-pressure tank is completed. As a result, the number of high-pressure tanks that can be manufactured per unit time can be increased.

A worker disposes the preform 100 within the mold 25 (S210). Specifically, the worker causes the support mechanism 34 to support the preform 100. The support mechanism 34 is rotatably supported with respect to the lower mold 30. The support mechanism 34 includes a rubber-made seal member for keeping the resin J from leaking from between the upper mold 20 and the lower mold 30. At the time of the execution of S210, the upper mold 20 is open unlike the state illustrated in FIG. 1.

The driving mechanism 80 temporarily tightens the upper mold 20 in accordance with the control of the control device 70 (S220). The worker operates a switch provided in the control device 70 after S210. The control device 70 automatically executes S220 to S280 by controlling individual parts of the manufacturing apparatus 10 when the switch is operated.

The temporary tightening is an intermediate state between a state where the upper mold 20 is open and a finally tightened state, and is to move the resin J to a position where a gap is present between the upper mold 20 and a preform 100, as illustrated in FIG. 1. The gap is larger than a gap between the lower mold 30 and the preform 100.

Even when the upper mold 20 is finally tightened in S260 to be described below, a gap is formed between the upper mold 20 and the preform 100. The size of the gap is substantially the same as the size of the gap between the lower mold 30 and the preform 100. The dimensions of the gaps as described above are designed by considering that the volume of the completed high-pressure tank becomes larger than the volume of the preform 100 by the filling and impregnating of the resin J.

The vacuum pump 50 starts vacuum degassing in accordance with the control of the control device 70 (S230). A timing at which the vacuum degassing is ended is substantially the same as the end timing of injection of the resin to be described below. As illustrated in FIG. 3, the rotating mechanism 32 starts to rotate in accordance with the control of the control device 70 (S240).

When the rotating mechanism 32 rotates, the preform 100 supported by the support mechanism 34 rotates in a circumferential direction. The rotation center of the preform 100 is a central axis O of the preform 100. The preform 100 can rotate in a state where the preform 100 is disposed within the mold 25 because the outer shape of a cross-section orthogonal to the central axis O is substantially circular. As described above, since the gap is present between the lower mold 30 and the preform 100, the preform 100 and the lower mold 30 are scarcely rubbed even when the preform 100 rotates.

The resin J is injected into the mold 25 (S250). Specifically, the control device 70 opens the valve 62 and pressurizes the resin J stored in the resin reservoir 64 with the pressurizing device 60. From the above, the resin J flows through a runner 22 provided in the upper mold 20, and the resin J is injected toward the preform 100 from a gate 24.

As the preform 100 rotates at the time of injection of the resin J, generation of a weld line is suppressed compared to a case where the preform 100 does not rotate. This is because the flow length of the resin J becomes shorter compared to a case where the preform 100 does not rotate. In a case where the preform 100 does not rotate, the flow length of the preform 100 in the circumferential direction becomes about half of an outer peripheral surface of the preform 100.

With respect to the above description, when the preform 100 rotates, the resin J is moved by the rotation. Thus, the flow length becomes shorter by an amount equivalent to the movement. Moreover, when the flow length becomes short, resins J, which have flowed into different directions after being injected from the gate 24, join together before the curing of the resin J proceeds. Thus, the generation of the weld line is suppressed.

Moreover, as the flow length becomes short, the resin J can be sufficiently filled into the mold even when the injection pressure in the gate 24 is set to a still lower injection pressure value. As a result, in a region where the resin J injected from the gate 24 collides with the preform 100, problems, such as deformation of the fiber layer or the liner, are suppressed.

Figure 4:
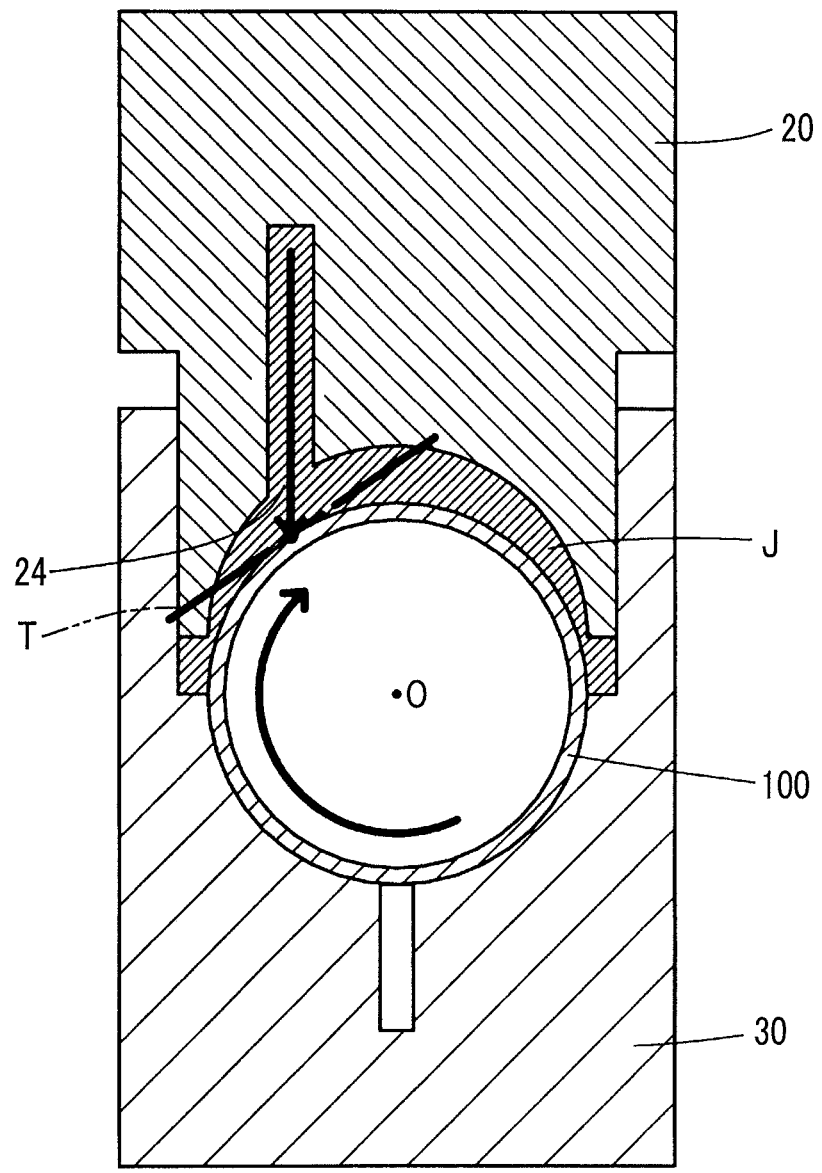
FIG. 4 is an IV-IV sectional view illustrated in FIG. 3.

FIG. 4 is an IV-IV sectional view illustrated in FIG. 3. In FIG. 1 and FIG. 3, the gate 24 is illustrated so as to be located immediately above the central axis O for convenience of illustration. However, in practice, as illustrated in FIG. 4, the gate 24 is at a position shifted from immediately, above the central axis O. Moreover, as illustrated in FIG. 4, a direction in which the resin J is injected from the gate 24 is a vertical direction. The lower mold 30 is installed on a horizontal plane. For this reason, the injection direction is at a position twisted from the central axis O. The central axis O is not on a direction of the injection. Namely, the resin J is not injected to the central axis O.

Since the injection direction is at the position twisted from the central axis O, the resin J injected from the gate 24 obliquely collides with the surface of the preform 100. That is, the resin J injected from the gate 24 has a velocity component in a direction of a tangential plane T of the preform 100 when colliding with the preform 100. The velocity in the first embodiment is a vector quantity. As illustrated in FIG. 4, the direction of the velocity component is a direction opposite to the velocity in the circumferential direction of the preform 100 resulting from rotation. Hereinafter, the relationship of the velocity as described above is referred to as a counter flow.

Due to the counter flow, the relative velocity between the velocity of the surface of the preform 100 and the velocity of the injected resin J is increased. As a result, the resin J injected from the gate 24 is easily impregnated up to the fiber that is located deeply in the fiber layer when colliding with the surface of the preform 100.

Figure 5:
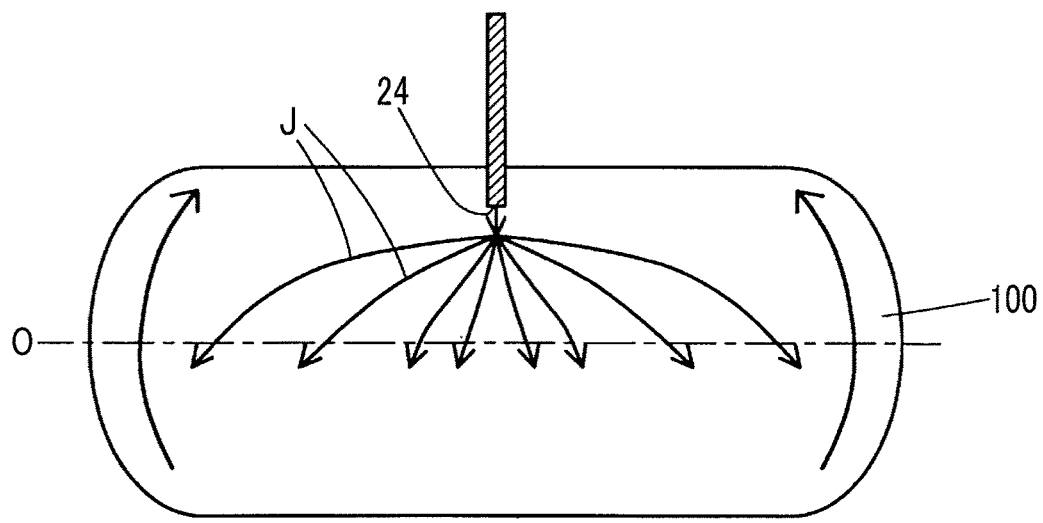
FIG. 5 is a view illustrating a state where the resin colliding with the preform is diffused.

FIG. 5 illustrates a state where the resin J colliding with the preform 100 is diffused. As described above, while a portion of the resin J colliding with the preform 100 is impregnated inside the fiber layer, while the remaining resin J flows between the preform 100 and the upper mold 20. Since the resin J that flows between the preform 100 and the upper molds 20 is the counter flow, the resin J is divided into a flow in a direction along the rotation of the preform 100 and a flow in a direction opposite the rotation of the preform 100, and flows in between the preform 100 and the lower mold 30. The flow in the direction opposite to the rotation of the preform 100 is illustrated in FIG. 5.

The reason why the resin J is diffused as illustrated in FIG. 5 is that when the resin J flows the direction opposite to the rotation of the preform 100, the momentum toward the lower mold 30 becomes weak, pressure is received due to the resin J injected later, and consequently, the resin J easily flows toward both ends of the central axis O.

As the resin J is diffused as described above, the generation of the weld line is further suppressed. This is because even when the diffused resin J and the resin J that flows in the direction of the rotation and is not diffused join together, diffusion degrees or flow velocities are different, so the line is not easily formed.

Since the upper mold 20 is temporarily tightened during the injection of the resin J as described above, the flow resistance of a gap between the upper mold 20 and the preform 100 is small. For this reason, the entire gap between the upper mold 20 and the preform 100 is quickly filled with the injected resin J. As a result, since the filling of the resin J into the mold is completed before the curing of the resin J proceeds, the generation of the weld line is further suppressed and the entire gap between the preform 100 and a mold 25 is easily and uniformly filled with the resin.

Figure 6:
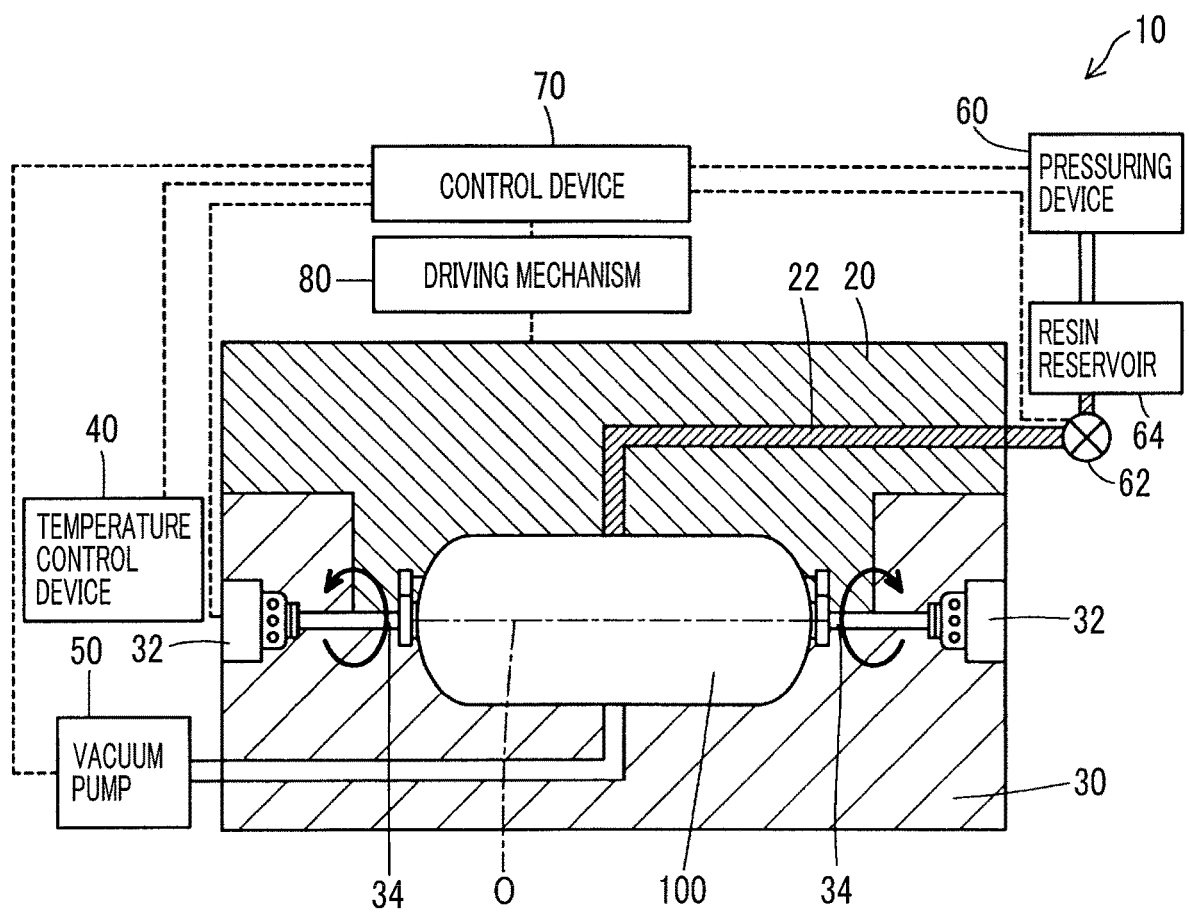
FIG. 6 is a sectional view illustrating a state where an upper mold is tightened.

After the filling of the resin J into the mold is completed, the control device 70 drives the driving mechanism 80 to finally tighten the upper mold 20 (S260). That is, the upper mold 20 is further tightened from the temporarily tightened state. FIG. 6 illustrates a state where the upper mold 20 is finally tightened. The pressure of the resin J received from the mold 25 is increased by the execution of S260. Due to the increase in the pressure, the impregnation is promoted, the resin J located near the surface of the fiber layer is leveled, and the surface becomes smooth.

Thereafter, before the curing of the resin J is completed, the control device 70 stops the rotation of the preform 100 (S270). Thereafter, after the resin J is cured, the control device 70 drives the driving mechanism 80 to open the upper mold 20 (S280). Timings at which S260, S270, and S280 are executed are managed by the elapsed times from the start of S250.

When the curing of the resin J is completed, a high-pressure tank is obtained. Finally, the worker takes out the high-pressure tank (S290).

As described above, according to the first embodiment, suppression of a problem resulting from the pressure of the injected resin J concentrating on one point immediately below the gate 24, the suppression of the generation of the weld line, shortening of manufacturing time, the uniform filling of the resin J into the mold, and the impregnation of the resin J into the fiber layer are realized.

The second embodiment will be described. The description of the second embodiment is mainly targeted at points different from those in the first embodiment. Particularly, the points that are not specifically described are the same as those in the first embodiment.

Figure 7:
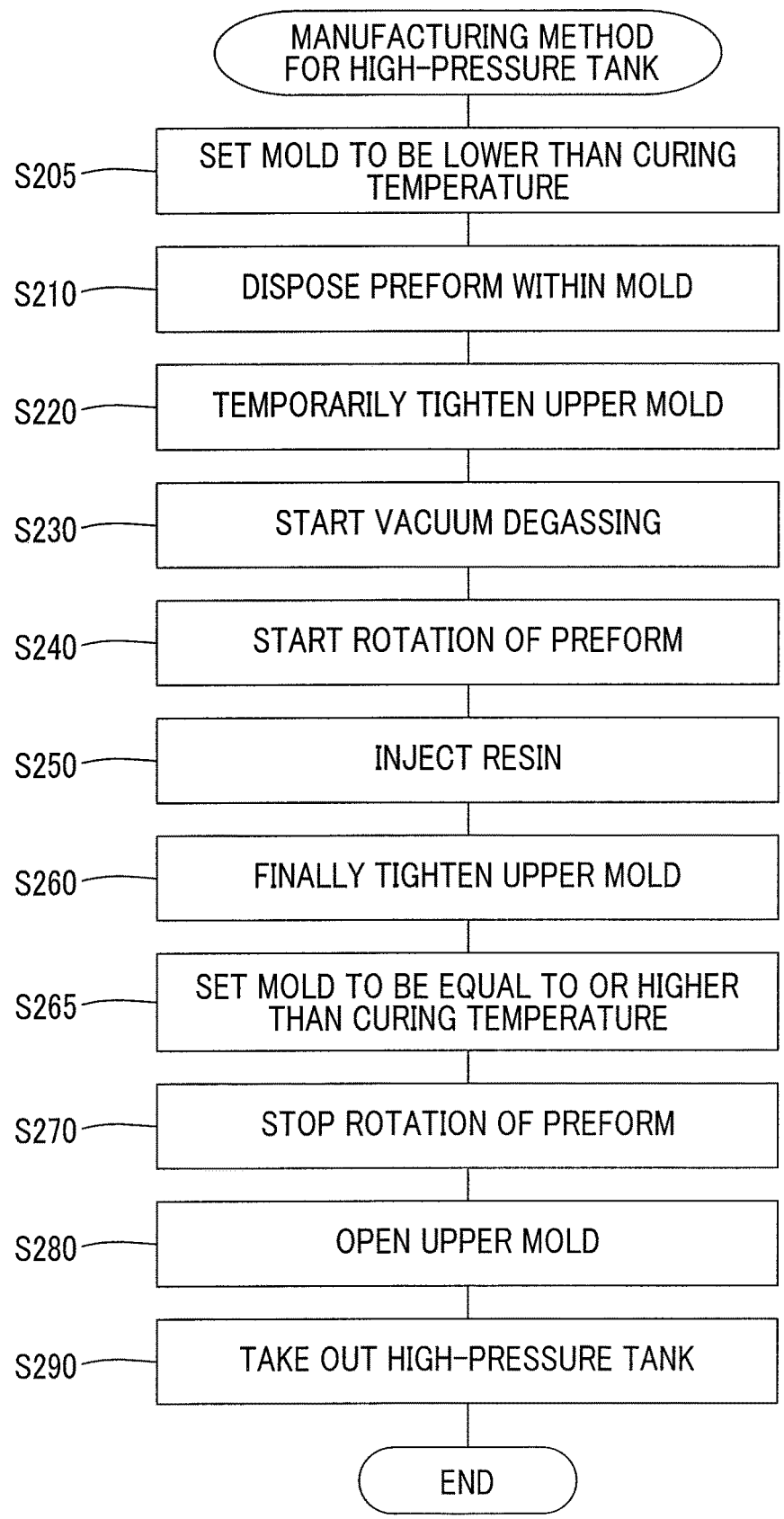
FIG. 7 is a flowchart illustrating a manufacturing method for a high-pressure tank in the second embodiment.

FIG. 7 is a flowchart illustrating a manufacturing method for a high-pressure tank in the second embodiment. Points different from the first embodiment are that S205 is changed and that S265 is added.

In S205 in the second embodiment, the temperature control device 40 sets the temperature of the mold 25 to a temperature equal to or lower than the curing temperature of the resin J.

S265 is executed after S260 and before S270. In S265, the temperature of the mold 25 is set to a temperature equal to or higher than the curing temperature of the resin J.

For this reason, the temperature of the mold 25 at the time of pouring of the resin J (S250) is lower than the curing temperature of the resin J, and the temperature of the mold 25 after the completion of filling of the resin J into the mold is equal to or higher than the curing temperature of the resin J. The expression "after the completion of filling of the resin J into the mold" as used in the second embodiment does not mean immediately after the filling is completed and means a point of time when a predetermined time has elapsed since the filling of the resin J into the mold is completed. In the second embodiment, the temperature of the mold 25 immediately after the filling of the resin J into the mold is completed is lower than the curing temperature of the resin J. In other embodiments, the temperature of the mold 25 immediately after a rise in the temperature of the mold 25 is started and the filling of the resin J into the mold is completed since the injection of the resin J is started may become equal to or higher than the curing temperature of the resin J. In the second embodiment, the timing of S270 and S280 is managed by the elapsed time from S265.

According to the second embodiment, it is possible to suppress an increase in the viscosity of the resin J at the time of the pouring of the resin J. As a result, a still lower injection pressure can be set, and the generation of the weld line can be further suppressed.

The present disclosure is not limited to the embodiments of the present specification and can be realized in various configurations within a scope not deviating from the gist of the present disclosure. For example, in the technical features in the embodiments corresponding to the technical features in the individual aspects described in the column "SUMMARY", in order to solve some or all of the above-described problems or in order to achieve some or all of the above-described effects, it is possible to appropriately perform substitutions and combinations. Additionally, unless the above-described technical features are described as being indispensable in the present specification, these technical features can be appropriately deleted. For example, the following embodiments are exemplified.

The gate 24 may be located immediately above the central axis O, and the injection direction of the resin J may intersect the central axis O.

A direction in which the resin is injected from the gate 24 may not be the vertical direction. That is, the direction in which resin is injected from the gate 24 may be is oblique.

The resin J may be injected in a state where the upper mold 20 is finally tightened. Alternatively, the upper mold 20 may be temporarily tightened at the injection start point of the resin J, and the upper mold 20 may be finally tightened before the completion of the filling.

The runner 22 and the gate 24 may be provided in the lower mold 30.

The lower mold 30 may not be installed on the horizontal plane.

The direction of the velocity component in the direction of the tangential plane T of a preform 100 may be the same direction as the circumferential velocity of the preform 100 resulting from rotation.

The resin may not be the thermosetting resin, and may be, for example, a thermoplastic resin or photocurable resin.

What is claimed is:

1. A manufacturing method for a pressure tank, the manufacturing method comprising:
    disposing a preform, in which a fiber layer is formed on an outer surface of a liner that forms an internal space of a pressure tank, within a mold; and
    rotating the preform in a circumferential direction within the mold with a central axis of the preform as a rotation center while resin is injected toward the preform disposed within the mold from a gate, wherein
    an injection direction of the resin is shifted from the central axis of the preform; and
    a direction of a velocity component resulting from the injection of the resin in a direction of a tangential plane of the preform at a position where the injected resin collides with a surface of the preform is a direction opposite to a velocity in the circumferential direction resulting from the rotation of the preform.

2. The manufacturing method according to claim 1, wherein:
    the mold includes a first mold and a second mold;
    the gate is provided in the first mold; and
    a gap larger than a gap between the second mold and the preform is formed between the first mold and the preform during the injection.

3. The manufacturing method according to claim 2, wherein:
    the gap formed between the first mold and the preform during the injection is a first gap; and
    the first mold is tightened so as to form the gap formed between the first mold and the preform as a second gap narrower than the first gap after filling of the resin into the mold is completed.

4. The manufacturing method according to claim 1, wherein:
    the resin is thermosetting resin; and a temperature of the mold is set to be equal to or higher than a curing temperature of the resin during the injection of the resin into the mold.

5. The manufacturing method according to claim 1, wherein:
the resin is thermosetting resin;
a temperature of the mold at a time of start of the injection of the resin into the mold is set to be lower than a curing temperature of the resin; and
the temperature of the mold after completion of filling of the resin into the mold is set to be equal to or higher than the curing temperature of the resin.

* * * * *